United States Patent
Tulloch

(10) Patent No.: US 11,845,549 B2
(45) Date of Patent: Dec. 19, 2023

(54) TRAILING EDGE PANEL SUPPORT WITH MOVABLE CONNECTOR

(71) Applicant: Airbus Operations Ltd., Bristol (GB)

(72) Inventor: William Tulloch, Bristol (GB)

(73) Assignee: Airbus Operations Limited, Bristol (GB)

( * ) Notice: Subject to any disclaimer, the term of this patent is extended or adjusted under 35 U.S.C. 154(b) by 13 days.

(21) Appl. No.: 17/703,678

(22) Filed: Mar. 24, 2022

(65) Prior Publication Data

US 2022/0306283 A1     Sep. 29, 2022

(30) Foreign Application Priority Data

Mar. 26, 2021   (GB) ...................................... 2104324

(51) Int. Cl.
   *B64C 9/16*     (2006.01)
   *B64C 9/02*     (2006.01)
   *B64F 5/10*     (2017.01)

(52) U.S. Cl.
   CPC .................. *B64C 9/16* (2013.01); *B64C 9/02* (2013.01); *B64F 5/10* (2017.01)

(58) Field of Classification Search
   CPC ................ B64C 9/16; B64C 9/02; B64F 5/10
   See application file for complete search history.

(56) References Cited

U.S. PATENT DOCUMENTS

| | | |
|---|---|---|
| 2,169,416 A | 8/1939 | Griswold |
| 4,007,896 A | 2/1977 | Reynolds |
| 4,247,066 A | 1/1981 | Frost et al. |
| 5,735,485 A | 4/1998 | Ciprian et al. |
| 5,839,698 A | 11/1998 | Moppert |
| 2009/0218446 A1* | 9/2009 | McAlinden ............... B64C 9/02 244/131 |
| 2013/0146712 A1 | 6/2013 | Stewart |
| 2019/0112027 A1* | 4/2019 | Ahern ....................... B64C 9/02 |
| 2019/0359314 A1* | 11/2019 | Tsai ........................... B64C 9/18 |
| 2020/0079491 A1* | 3/2020 | Gruner ...................... B64C 3/56 |

(Continued)

FOREIGN PATENT DOCUMENTS

| | | |
|---|---|---|
| EP | 0154047 A1 | 9/1985 |
| GB | 445270 A | 4/1936 |

OTHER PUBLICATIONS

British Search Report for Application No. GB2104323 dated Sep. 28, 2021.

(Continued)

*Primary Examiner* — Rodney A Bonnette
(74) *Attorney, Agent, or Firm* — KDW Firm PLLC

(57) ABSTRACT

An aircraft wing including a wingbox with an upper cover, a lower cover, a forward spar and a rear spar. A leading edge of a trailing edge panel is attached to the wingbox. A support structure is attached to the wingbox and a connector is movably mounted to the trailing edge panel on a bearing. A first end of a link is attached to the connector, and a second end of the link is attached to the support structure. During assembly, the connector is moved on the bearing from a first position to a second position where the connector is aligned with the first end of the link, then the connector at the second position is attached to the first end of the link. The connector may be moved by a rack-and-pinion mechanism.

21 Claims, 5 Drawing Sheets

(56) References Cited

U.S. PATENT DOCUMENTS

| | | |
|---|---|---|
| 2020/0207459 A1 | 7/2020 | Ehring et al. |
| 2022/0306274 A1* | 9/2022 | Tulloch .................... B64C 9/16 |
| 2022/0306279 A1* | 9/2022 | Tulloch .................... B64C 9/18 |
| 2022/0306282 A1* | 9/2022 | Tulloch .................... B64C 9/16 |

OTHER PUBLICATIONS

British Search Report for Application No. GB2104324 dated Sep. 27, 2021.
British Search Report for Application No. GB2104325 dated Sep. 24, 2021.
British Search Report for Application No. GB2104326 dated Sep. 27, 2021.

* cited by examiner

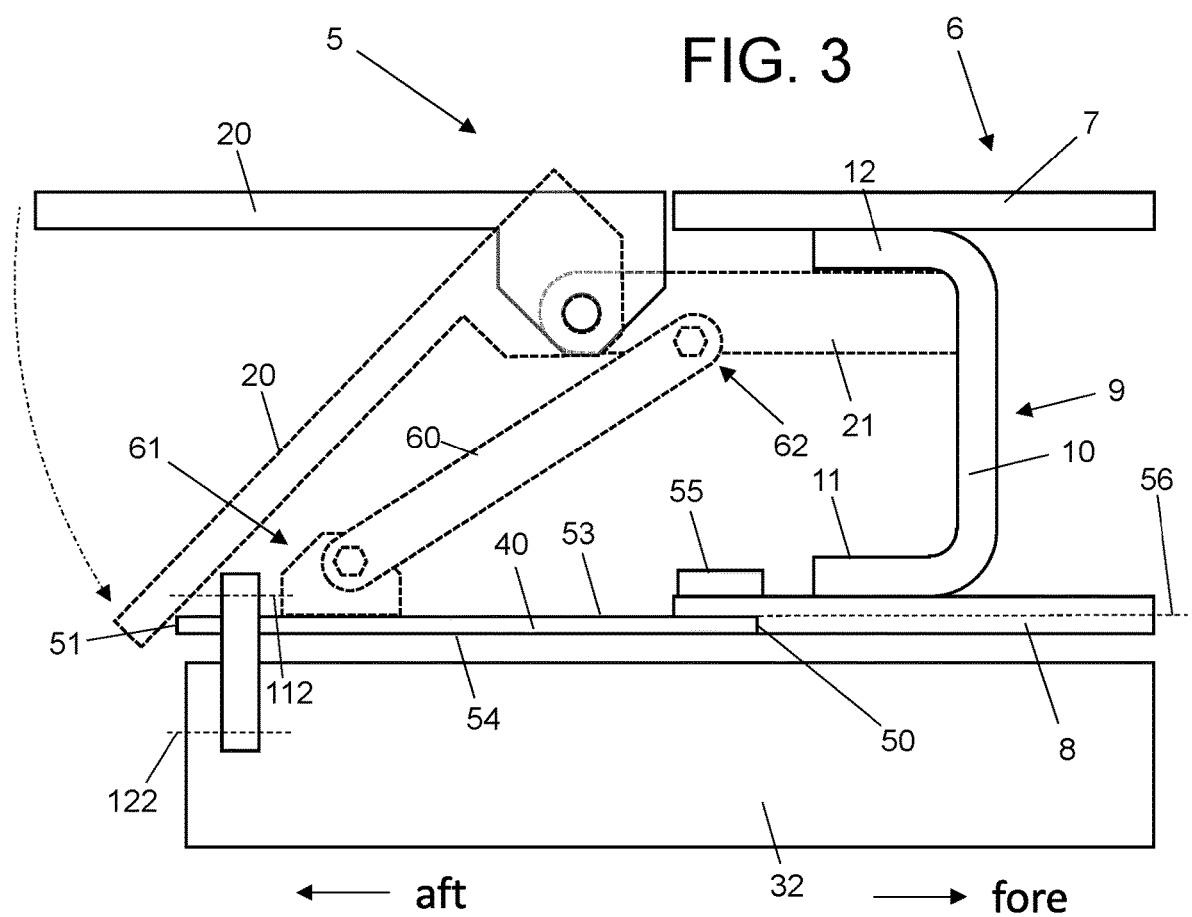
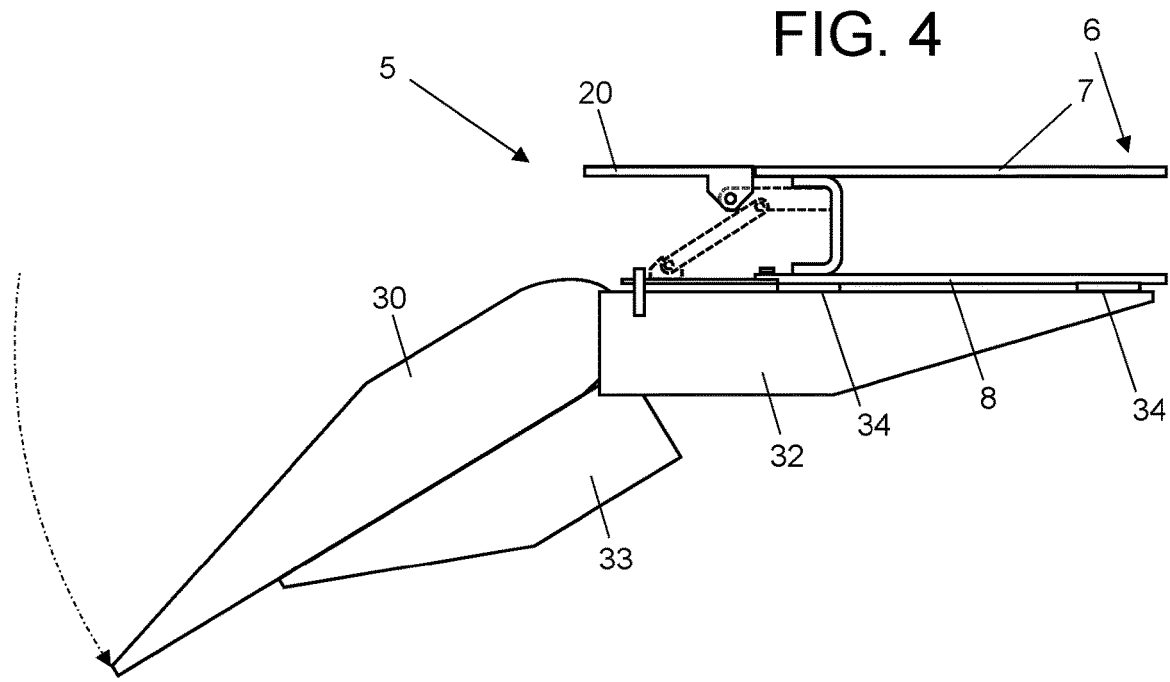

TRAILING EDGE PANEL SUPPORT WITH MOVABLE CONNECTOR

CROSS-REFERENCE TO RELATED APPLICATION

This application claims priority to GB 2104324.5 filed Mar. 26, 2021, the entire disclosure of which is incorporated by reference herein.

TECHNICAL FIELD

The disclosure herein relates to an aircraft wing comprising a wingbox with an upper cover, a lower cover, and a rear spar. A trailing edge panel is attached to the wingbox. In particular, the disclosure herein relates to a support arrangement for supporting the trailing edge panel. The disclosure herein also relates to a method of installing a trailing edge panel, and a method of installing or removing routings in an aircraft wing.

BACKGROUND

US2013/0146712 discloses an aircraft wing with an upper shroud panel, and a lower shroud panel. Both shroud panels are attached to, and extend from, respective skin overhangs. In order to attach the upper shroud panel to the upper wing skin overhang, a plurality of pivoting butt straps are provided.

A lower strut joins an attachment lug of the lower shroud panel to a spoiler support rib. The lower strut extends in a fore-aft direction in a vertical chordwise plane. An upper strut is pin joined to the upper shroud panel and to the spoiler support rib. The upper strut extends in a vertical spanwise plane.

SUMMARY

A first aspect of the disclosure herein provides an aircraft wing comprising a wingbox with an upper cover, a lower cover, and a rear spar; a trailing edge panel with a leading edge, wherein the leading edge of the trailing edge panel is attached to the wingbox; a support structure attached to the wingbox; a connector movably mounted to the trailing edge panel on a bearing; and a link with a first end and a second end, wherein the first end of the link is attached to the connector and the second end of the link is attached to the support structure.

Optionally the trailing edge panel defines a plane, and the connector is movably mounted to the trailing edge panel on the bearing such that the connector can move parallel to the plane.

Optionally the connector comprises a rack, and the aircraft wing further comprises a pinion gear coupled to the rack.

Optionally the bearing is a linear bearing.

Optionally the trailing edge panel is a lower trailing edge panel.

Optionally the lower trailing edge panel has an upper surface, and a lower surface which is configured to be exposed to airflow during flight of the aircraft wing.

Optionally the bearing is mounted to the upper surface of the lower trailing edge panel.

Optionally the wing further comprises a spoiler; and a spoiler stop protruding from an upper surface of the lower trailing edge panel, wherein the spoiler stop is configured to be contacted by the spoiler in the event of an over-travel failure of the spoiler.

Optionally the support structure is attached to the lower cover, preferably by a tension joint.

Optionally the support structure comprises a fairing.

Optionally the wing further comprises a flap; and a flap deployment mechanism which is configured to deploy the flap, wherein the fairing covers the flap deployment mechanism.

Optionally the lower trailing edge panel has a trailing edge opposite the leading edge, and a pair of opposite spanwise edges; the fairing has an upper edge; the bearing is attached to the upper surface of the lower trailing edge panel adjacent to one of the spanwise edges of the lower trailing edge panel; and the second end of the link is attached to the fairing adjacent to the upper edge of the fairing.

Optionally the second end of the link is pivotally attached to the support structure at a pivot joint, and the first end of the link is higher than the pivot joint.

Optionally wherein the first end of the link is directly above the pivot joint.

Optionally the first end of the link is pivotally attached to the connector at a first pivot joint, and the second end of the link is pivotally attached to the support structure at a second pivot joint.

Optionally the first pivot joint is configured to permit rotation about a first pivot axis, and the second pivot joint is configured to permit rotation about a second pivot axis which is preferably substantially parallel with the first pivot axis.

Optionally the trailing edge panel further comprises a trailing edge, an inboard edge and an outboard edge; the support structure comprises an inboard face and an outboard face, and either: the support structure is positioned inboard of the inboard edge of the trailing edge panel, and the link is attached to the inboard face of the support structure; or the support structure is positioned outboard of the outboard edge of the trailing edge panel, and the link is attached to the outboard face of the support structure.

Optionally the wing further comprises routings which run along the aircraft wing behind the rear spar in a spanwise direction.

A further aspect of the disclosure herein provides a method of assembling or disassembling the aircraft wing, the method comprising installing or removing the routings by moving them transverse to their length past the link.

A further aspect of the disclosure herein provides a method of installing a trailing edge panel in an aircraft wing, the aircraft wing comprising: a wingbox with an upper cover, a lower cover, and a rear spar; a trailing edge panel with a leading edge; a support structure attached to the wingbox; a connector mounted to the trailing edge panel on a bearing; and a link with a first end and a second end, wherein the second end of the link is attached to the support structure, the method comprising: attaching the leading edge of the trailing edge panel to the wingbox; moving the connector on the bearing from a first position to a second position where the connector is aligned with the first end of the link; and then attaching the connector at the second position to the first end of the link.

Optionally the bearing is a linear bearing, and the connector translates on the linear bearing.

BRIEF DESCRIPTION OF THE DRAWINGS

Embodiments of the disclosure herein will now be described with reference to the accompanying drawings, in which:

FIG. 3 shows the spoiler in an over-travel drooped position;

FIG. 4 shows the flap in a high-lift position;

DETAILED DESCRIPTION

Figure 1:
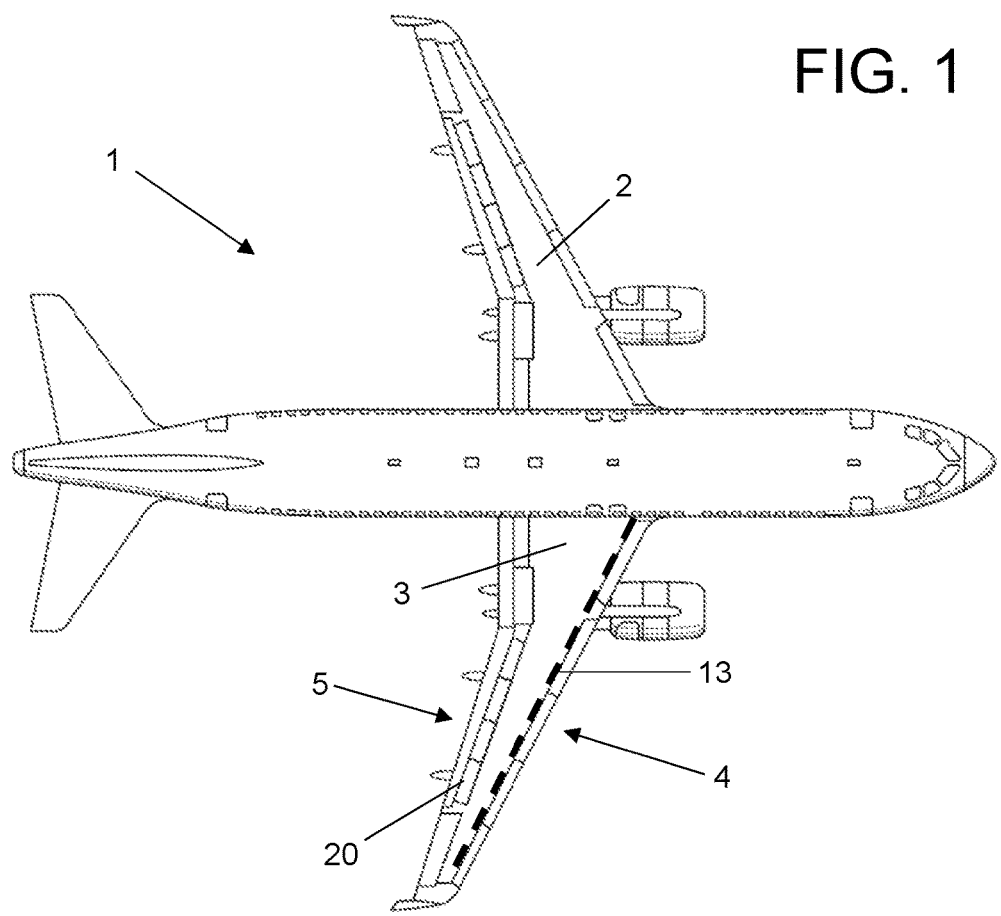
FIG. 1 is a plan view of an aircraft.

An aircraft 1 shown in FIG. 1 has a pair of aircraft wings 2, 3 extending from a fuselage. The wings are identical and only the starboard wing 3 will be described below.

Figure 2:
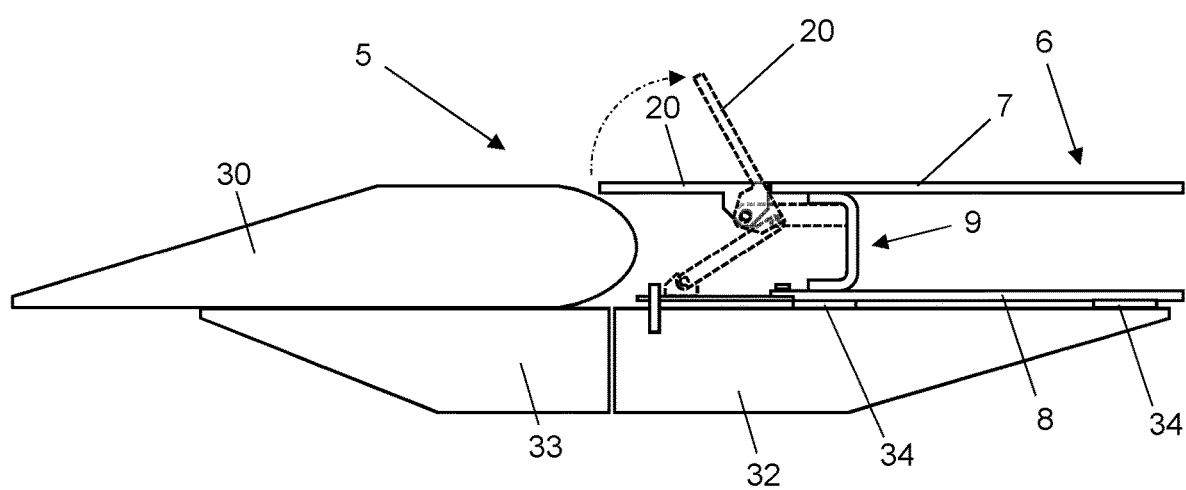
FIG. 2 shows a trailing edge of the starboard wing, viewed from an outboard direction.

The wing 3 has a leading edge 4 and a trailing edge 5. FIG. 2 is a sectional view of the trailing edge 5 viewed from an outboard direction. The wing 3 comprises a wingbox 6 with an upper cover 7, a lower cover 8, a forward spar 13, and a rear spar 9. The forward spar is not shown in FIG. 2, but it is indicated schematically by a dashed line 13 in FIG. 1.

Figure 6:
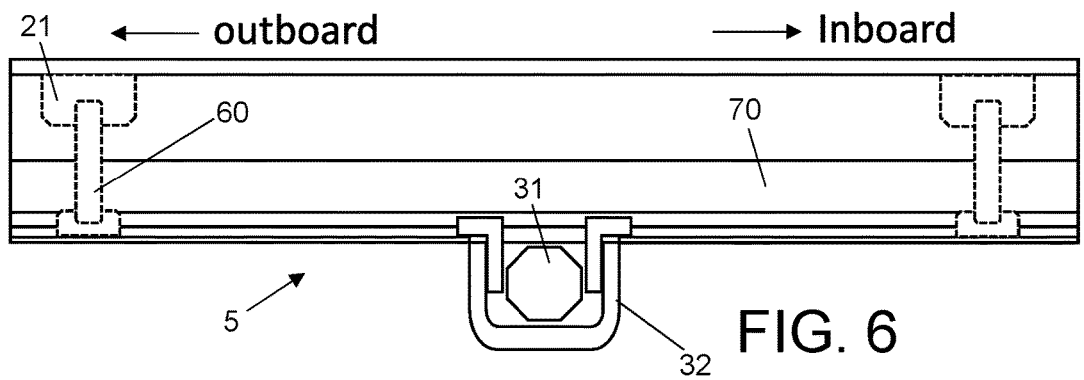
FIG. 6 is a rear view of the part of the trailing edge.

The forward and rear spars 13, 9 are spaced apart in a fore-aft or chordwise direction indicated in FIG. 3, and the spars extend away from the fuselage in a spanwise outboard direction indicated in FIG. 6.

Referring to FIG. 3, the rear spar 9 has a vertical spar web 10, and a pair of flanges 11, 12 which are attached to the upper and lower covers 7, 8 respectively. The covers 7, 8 each have an overhanging portion behind the rear spar 9. The covers 7, 8 are attached to the forward spar 13 in a similar fashion.

The trailing edge 5 carries a set of spoilers, one of which is labelled 20 in FIG. 1 and shown in FIGS. 2-4. As shown in FIG. 3, the spoiler 20 is pivotally mounted on a spoiler support bracket 21 which is attached to the rear spar 9. The spoiler 20 can be moved between a central low drag position shown in solid lines in FIGS. 2 and 3, a raised position showed in dashed lines in FIG. 2, and a drooped position in which the spoiler is rotated down. In the event of failure of the spoiler deployment mechanism, it may rotate down too far, to an over-travel drooped position shown in dashed lines in FIG. 3.

Figure 5:
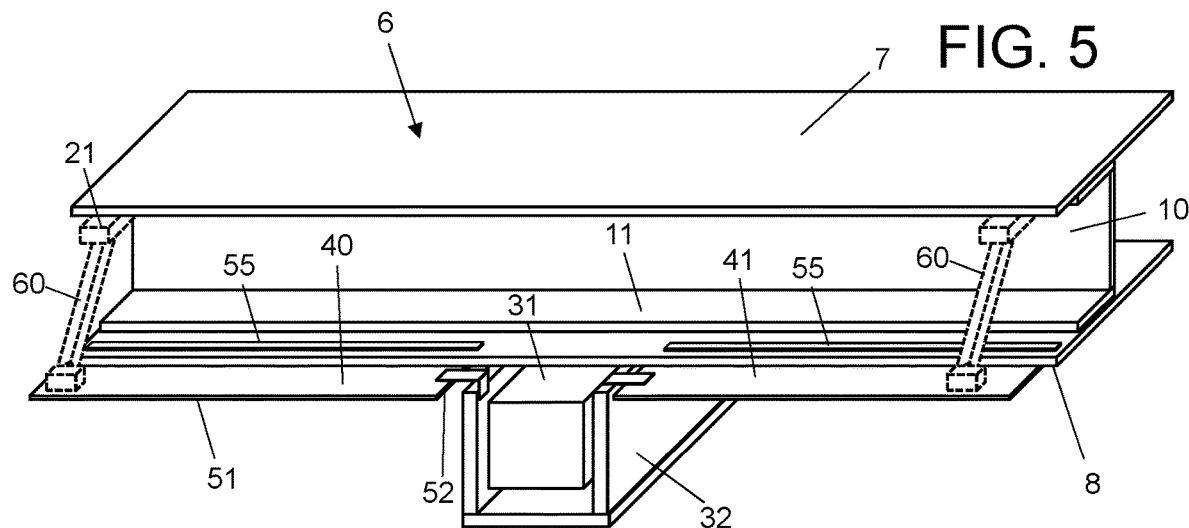
FIG. 5 is an isometric view showing part of the trailing edge.
Figure 7:
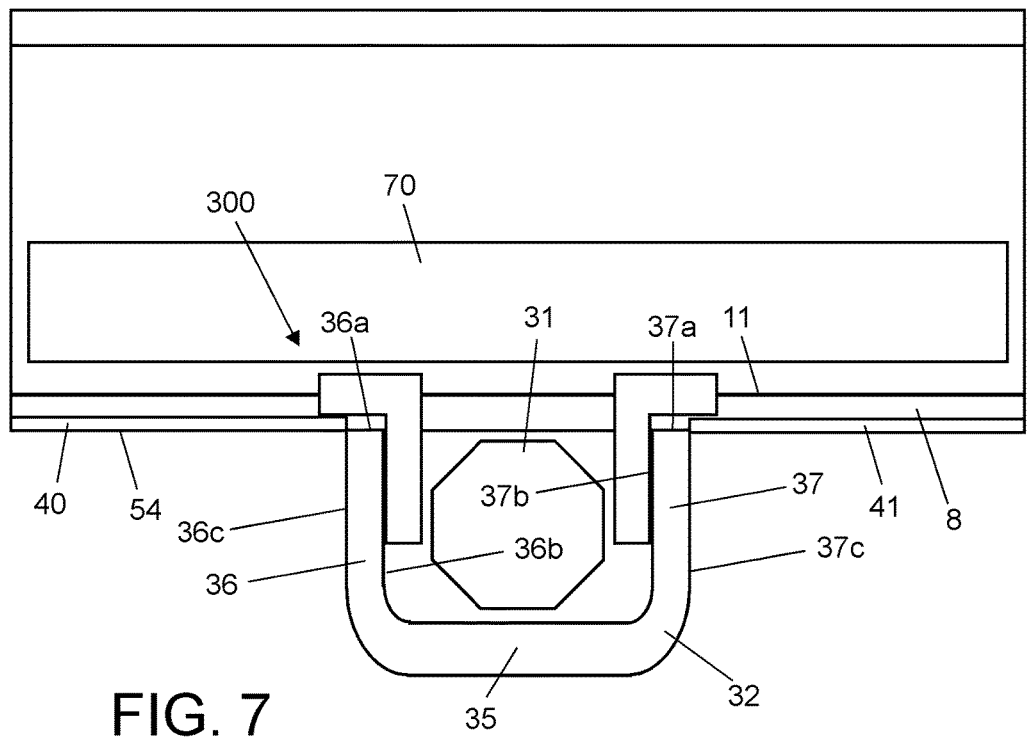
FIG. 7 is an enlarged view showing the flap track fairing.

The trailing edge 5 also carries a pair of flaps, one of which is labelled 30 in FIG. 1 and shown in FIGS. 2 and 4. A deployment mechanism 31 shown in FIGS. 5-7 is configured to deploy the flap 30 between a low drag position shown in FIG. 2, and a high lift position shown in FIG. 4. The deployment mechanism 31 may comprise a flap track which carries the flap 30 and is driven on rollers to deploy the flap 30, or any other kind of deployment mechanism.

A pair of fairings 32, 33 cover the flap deployment mechanism 31. A fixed fairing 32 is attached to the lower cover 8 by tension joints 34 and covers a forward part of the deployment mechanism 31. A movable fairing 33 covers a rear part of the deployment mechanism 31 and moves with the flap 30. These fairings 32, 33 are conventionally known as flap-track fairings.

As shown in FIG. 7, the fixed fairing 32 has a U-shaped profile, with a horizontal base 35 and a pair of vertical side walls 36, 37. Each side wall has an upper edge 36a, 37a which is attached to the lower cover 8 by the tension joints 34; an inner surface 36b, 37b which faces towards the flap deployment mechanism 31; and an outer surface 36c, 37c which faces away from the flap deployment mechanism 31. The outer surfaces 36c, 37c are configured to be exposed to airflow during flight of the aircraft.

The trailing edge 5 also has a set of lower trailing edge panels which fill the gap between the trailing edge of the lower cover 8 and the flap 30. Parts of two of the lower trailing edge panels are shown in FIGS. 5-7: a first lower trailing edge panel 40 on an outboard side of the fairing 32, and a second lower trailing edge panel 41 on an inboard side of the fairing 32. The panels 40, 41 are similar, so only the first panel 40 will be described in detail.

The panel 40 has a leading edge 50 (shown in FIG. 3) which is attached to the wingbox, and a trailing edge 51 opposite the leading edge 50. The leading edge 50 and the trailing edge 51 extend in the spanwise direction, parallel with the rear spar 9.

The leading edge 50 of the panel 40 is attached to the overhanging portion of the lower cover 8 by anchor nut rails 55. Each anchor nut rail 55 carries a line of anchor nuts (not shown) and the leading edge 50 of the panel 40 is attached by passing fasteners through the panel 40, the overhanging portion of the lower cover 8, and the nut rail 55 and then screwing the fasteners into the anchor nuts.

The panel 40 also terminates at each end at a pair of opposite spanwise edges: an inboard edge 52 shown in FIGS. 5-7 at one spanwise end of the panel 40, and an outboard edge (not shown) at an opposite spanwise end of the panel 40.

The panel 40 also has a horizontal upper surface 53 and a horizontal lower surface 54, indicated in FIG. 3. The lower surface 54 is configured to be exposed to airflow during flight of the aircraft. The upper surface 53 defines a plane 56.

The panel 40 is attached to the spoiler support bracket 21 by one or more mid-span support links 60. One of such mid-span support links 60 is shown in FIG. 3. The mid-span support link 60 extends from a first end to a second end. The first end of the mid-span support link 60 is pivotally attached to the lower trailing edge panel 40 at a first pivot joint 61, and the second end of the mid-span support link 60 is pivotally attached to the spoiler support bracket 21 at a second pivot joint 62. The second pivot joint 62 is higher than the first pivot joint 61.

As shown in FIG. 3, the mid-span support link 60 extends in a fore-aft direction in a vertical chordwise plane.

Figure 8:
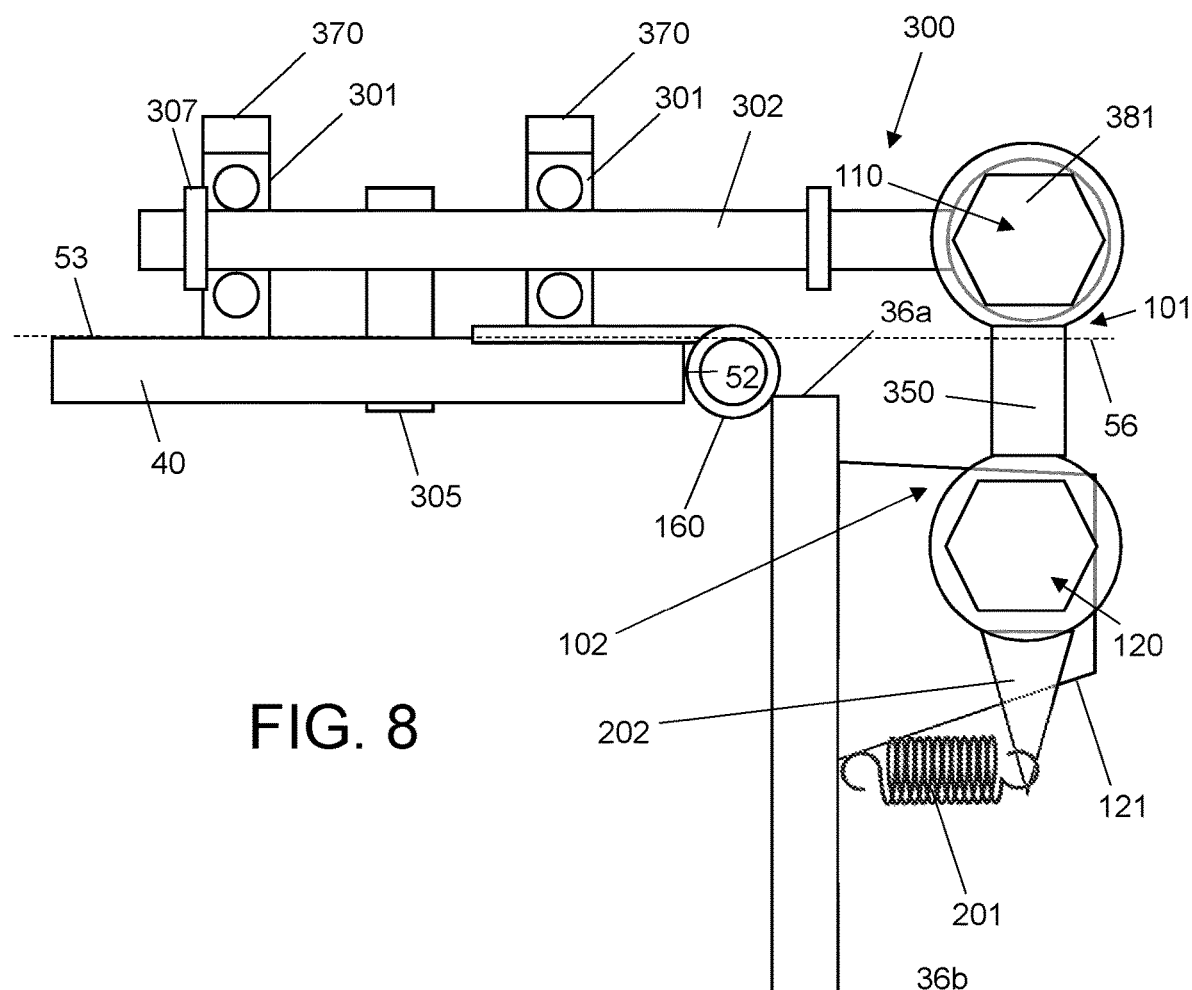
FIG. 8 shows a panel support arrangement according to an embodiment of the disclosure herein.

A resilient elastomeric seal member 160, shown in FIG. 8, seals a gap between the upper edge 36a of the side wall 36 of the fairing 32, and the inboard edge 52 of the lower trailing edge panel 40. The seal member 160 can flex to enable the panel 40 to deflect in the spanwise direction, while continuing to seal the gap.

Optionally one or more of the panels 40, 41 are removable, enabling access to the trailing edge 5 for inspection or repair. The panels 40, 41 may be made from a cheaper, thinner and lighter material than the lower cover 8. It is therefore important that the panels 40, 41 do not pick up bending loads as the wing bends during flight. For this reason the support arrangements for the panels 40, 41 (i.e. the mid-span support links 60, the anchor nut rails 55, etc.) may allow the panels 40, 41 to deflect relative to the wingbox 6, particularly in a spanwise direction.

Minimizing space within the trailing edge 5 maximizes fuel tank volume and minimizes the height of the airfoil section, which maximizes performance. The space available within the trailing edge 5 may therefore be very limited, and so it is important that the support arrangements for the panels 40, 41 take up as little of this space as possible.

The trailing edge 5 also houses various mechanical and electrical systems routings 70 shown in FIGS. 6 and 7 which run along the wing behind the rear spar 9 in a spanwise direction. The support arrangements for the panels 40, 41 must not clash with these routings 70, or any other obstructions.

It is preferable that the support arrangements for the panels 40, 41 enable the routings 70 to be installed or removed as a modular unit by moving them in the fore-aft direction (transverse to their length) rather than by threading the routings 70 along the wing in the spanwise direction (along their length).

Thus, the routings 70 may be installed by moving them in the forward direction into the rear spar, then fitting the mid-span support links 60. This process may be reversed to remove the routings 70: removing the mid-span support links 60 and then removing the routings 70 from the rear spar in the aft direction.

The support arrangements for the panels 40, 41 must also be low profile, in order to maintain kinematic function of all moveables (flaps, spoilers, ailerons etc.).

Another important design constraint for the panels 40, 41, and their support arrangements, is that they can withstand an over-travel failure of the spoiler 20, in which the spoiler 20 rotates down to the over-travel drooped position shown in dashed lines in FIG. 3. Note that in FIG. 3 the spoiler has contacted the trailing edge 51 of the panel 40, which may cause damage to the spoiler 20 and/or to the panel 40.

The trailing edge 5 may also have upper trailing edge panels, located at parts of the wing where there are no spoilers. Such upper trailing edge panels share some of the design constraints of the lower trailing edge panels 40, 41, in particular the requirements that the support arrangements for the upper trailing edge panels take up only a small amount of space, and do not clash with the routings 70, or any other obstructions.

As explained above, a mid-span region of the lower trailing edge panel 40 is supported by one or more mid-span support links 60. In order to avoid flutter caused by the complex airflows at each spanwise end of the panel 40, it is also desirable to provide support for the inboard and outboard edges of the panel 40. To this end, the inboard edge 52 of the lower trailing edge panel 40 is attached to the side wall 36 of the fairing 32 by a panel support arrangement 300 which is illustrated schematically in FIGS. 2-7, and in detail in FIG. 8. The outboard edge of the lower trailing edge panel 41 is attached to the fairing 32 by a similar panel support arrangement which is also illustrated schematically in FIGS. 2-7.

The panel support arrangement 300 shown in FIG. 8 comprises a link 350 which extends from a first end 101 to a second end 102. The link 350 may be made from aluminum, or any other suitable material.

The first end 101 of the link 350 is pivotally attached to the upper surface 53 of the lower trailing edge panel at a first pivot joint 110 adjacent to the inboard edge 52 of the lower trailing edge panel. The second end 102 of the link 350 is pivotally attached to the inner surface 36b of the side wall 36 of the fairing 32 at a second pivot joint 120 adjacent to the upper edge 36a of the side wall 36 of the fairing 32.

As shown in FIG. 8, the upper surface 53 of the lower trailing edge panel 40 is substantially perpendicular to the inner surface 36b of the side wall 36 of the fairing 32.

The second pivot joint 120 comprises a bracket 121 which protrudes from the inner surface 36b of the side wall 36 of the fairing 32 adjacent to the upper edge 36a of the side wall 36.

The first pivot joint 110 is located above the plane 56 of the panel, and the second pivot joint 120 is located below the plane 56 of the panel. The link 350 is a straight arm which extends downwardly at all points from the first end 101 of the link to the second end 102 of the link.

The first pivot joint 110 is a pin joint which is configured to only permit rotation about a first pivot axis 112, indicated in FIG. 3, which extends in the fore-aft (or chordwise) direction. The second pivot joint 120 is similar—i.e. it is a pin joint which is configured to only permit rotation about a second pivot axis 122, also indicated in FIG. 3, which also extends in the fore-aft or chordwise direction. The second pivot axis 122 is preferably substantially parallel with the first pivot axis 112.

The panel support arrangement 300 is designed to be used if there is an obstruction inside the fairing 32 (such as the deployment mechanism 31) which prevents the link 350 from being rotated up, and also an obstruction above the panel 40 (such as the mechanical and electrical systems routings 70) which prevents the first end 101 of the link being accessible from above. The panel support arrangement 300 can be installed without any rotation of the link 350.

A biasing arrangement is provided in the form of a spring 201 coupled to the link 350 by a downward grow-out 202.

The spring 201 biases the link 350 towards an upright orientation in which the first end 101 of the link 350 is directly above the second pivot joint 120. During assembly of the trailing edge 5 as shown in FIG. 10, the link 350 is held in its upright orientation by the spring 201.

Figure 10:
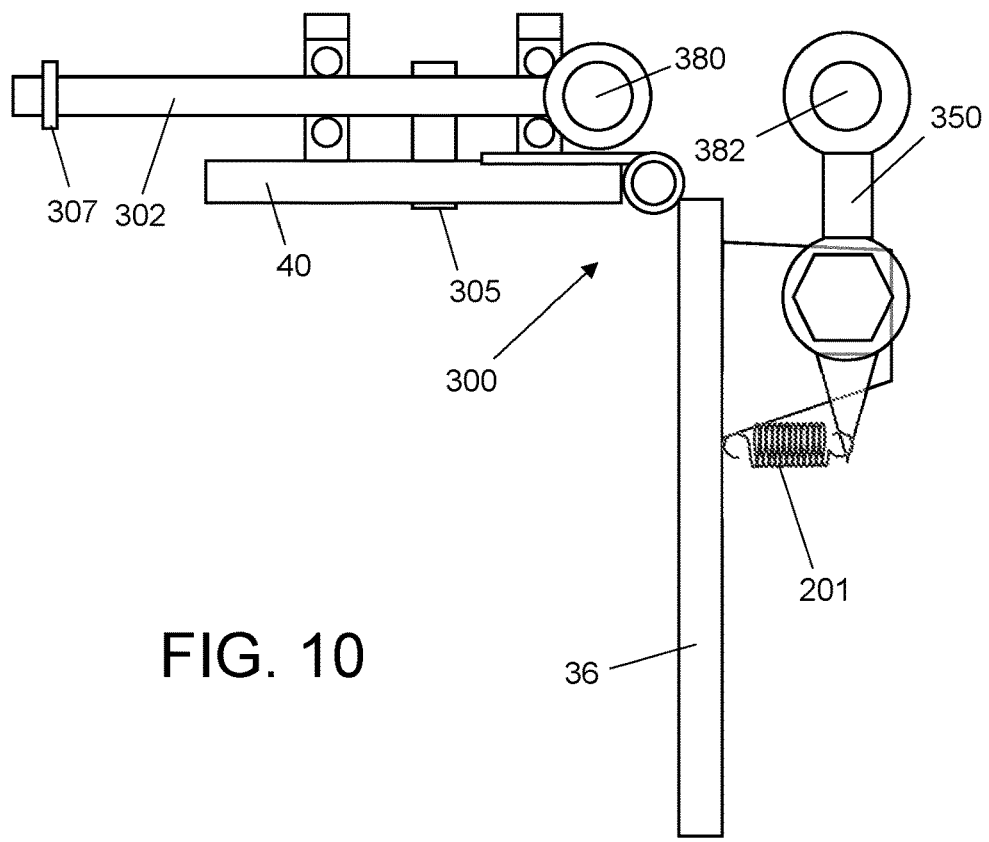
FIG. 10 shows the connector beam in a retracted position.

In FIG. 10, the spring 201 is in a low energy state—i.e., it is not compressed or extended. The link 350 has a tendency to fall down under the force of gravity to bring its center of gravity directly under the second pivot joint 120. The spring 201 applies a biasing force which opposes this tendency of the link 350 to fall down. So, the spring 201 holds the link 350 in its upright orientation by applying the biasing force to the link 350.

Optionally a light damper may also be provided to retain the link in the upright position of FIG. 10.

A pair of linear bearings 301 are mounted to the upper surface 53 of the lower trailing edge panel 40. The linear bearings 301 protrude from the upper surface 53 of the lower trailing edge panel and provide spoiler stops configured to be contacted by the spoiler 20 in the event of an over-travel failure of the spoiler. The top of each linear bearing 301 carries a PTFE stopper 370 to avoid damage from (or to) the spoiler 20.

A connector beam 302 is movably mounted to the trailing edge panel on the bearings 301. The first end 101 of the link 350 is pivotally attached to a distal end of the connector beam 302 to form the first pivot joint 110.

Figure 9:
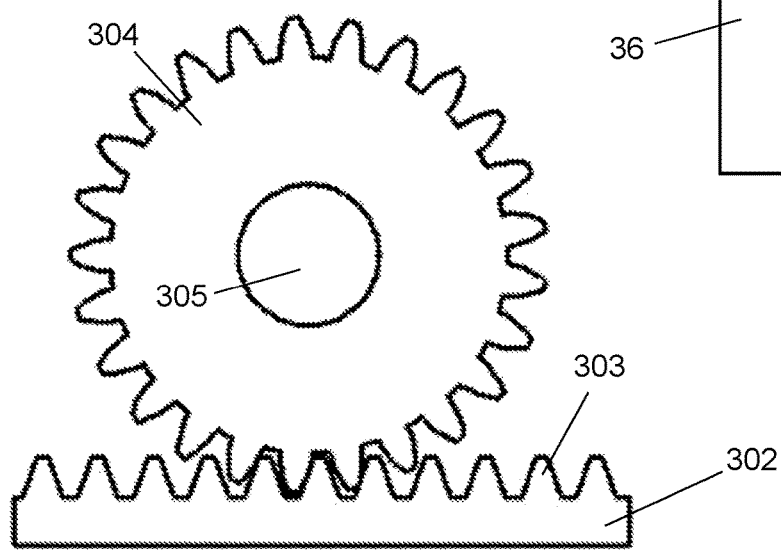
FIG. 9 shows the rack-and-pinion mechanism.

The connector beam 302 comprises a rack 303 shown in FIG. 9. A pinion gear 304 on a shaft 305 is coupled to the rack 303. As shown in FIG. 8, the shaft 305 extends through the panel 40 so it can be engaged from below by a rotary tool.

In the final secured state of FIG. 8, the link 350 is in an upright orientation with the first end 101 of the link directly above the second pivot joint 120. So the spring 201 is in a low energy state whereby if the first end 101 of the link is detached from the connector beam 302, the link 350 will not move and the spring 201 will hold the link 350 in its upright orientation.

In an initial assembly stage shown in FIG. 10, the connector beam 302 is in a first (retracted) position. This enables the panel 40 to be lifted up into position without the connector beam 302 clashing with the side wall 36 of the fairing. The spring 201 holds the link 350 in the upright orientation shown in FIG. 10 as the panel 40 is lifted up.

Providing the connector beam 302 in a retracted position during installation of the panel 40 is particularly important when there is an identical panel support arrangement 300 at the opposite (outboard) end of the panel 40. If the connector beams 302 were protruding beyond the spanwise ends of the panel 40, then they would clash with other structure so it would not be possible to lift the panel 40 up into position.

Next, the leading edge of the trailing edge panel 40 is attached to the wingbox. Then a rotary tool 306 under the panel 40 is operated to rotate the pinion gear 304 and drive the connector beam 302 so that it slides on the bearings 301 from the first position of FIG. 10 to a second (extended) position shown in FIG. 11 where it protrudes beyond the inboard edge 52 of the panel. This arrangement enables the connector beam 302 to be driven from below the panel 40 without requiring access from the highly congested trailing edge space above the panel 40.

In the second (extended) position, the distal end of the connector beam 302 is aligned with the first end 101 of the link. The distal end of the connector beam 302 and the first end 101 of the link are located relative to each other either by visual inspection, or controlled by a stop 307 which limits the maximum extent of the connector beam's travel by engaging one of the bearings 301 as shown in FIG. 11.

Figure 11:
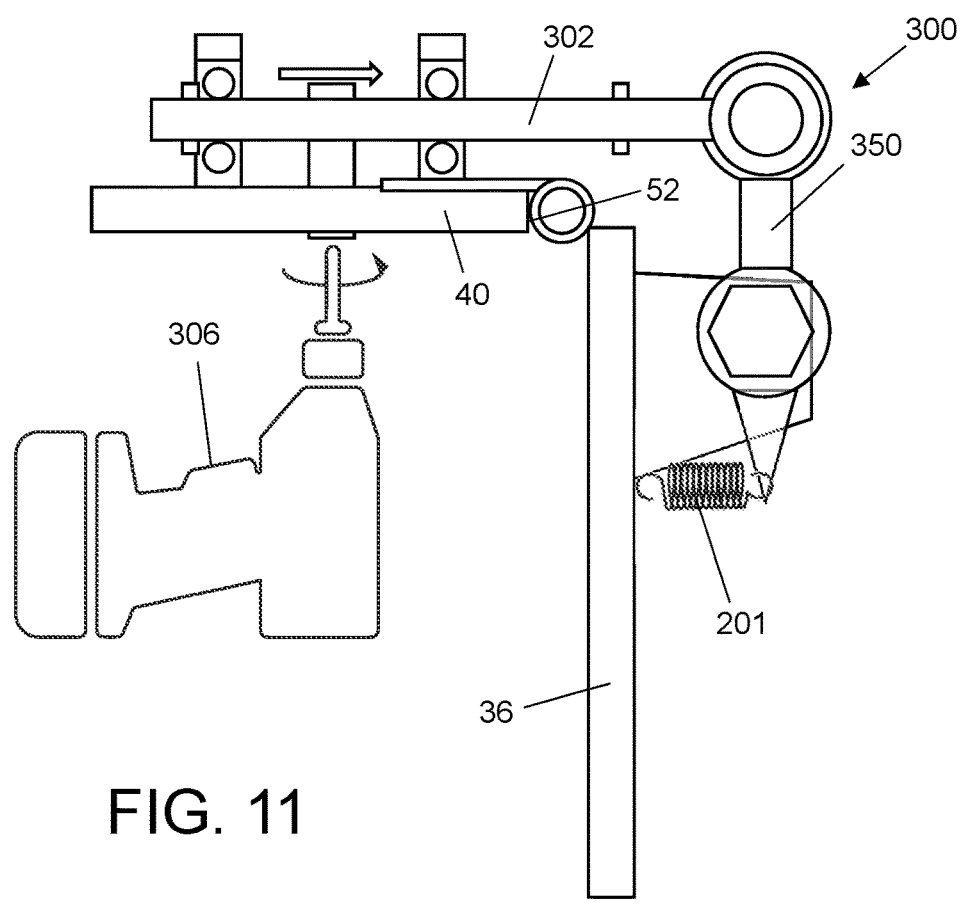
FIG. 11 shows the connector beam being driven to an extended position.

Finally, the connector beam 302 at the second (extended) position of FIG. 11 is attached to the first end 101 of the link to form the first pivot joint 110 shown in FIG. 8 by installing a bolt or pin 381 through a hole 380 at the distal end of the connector beam 302, and a hole 382 at the first end 101 of the link. The link 350 is in its upright orientation when the first end 101 of the link is attached to the connector beam 302.

In the panel support arrangement 300 of FIGS. 8-11, the stiffness of the spring 201 is tuned by design to be: a) stiff enough to hold the link 350 in position and not vibrate or oscillate into contact with structure during transport prior to connection; and b) flexible enough to enable the link 350 to deflect during flight to avoid wing bending loads being fed into the panel 40.

In this embodiment, the connector beam 302 is mounted on linear bearings 301 so it slides on the bearings 301 from the first (retracted) position of FIG. 10 to the second (extended) position of FIG. 11. In another embodiment, the connector beam 302 may be mounted on a rotary bearing with a vertical axis so it rotates horizontally to the second (extended) position of FIG. 11.

As noted above, the trailing edge panel defines a plane 56, and the connector beam 302 is movably mounted to the trailing edge panel on the bearing such that the connector beam 302 can move parallel to the plane 56. In this case the linear bearings 301 are configured to enable the connector beam 302 to translate in a straight line parallel to the plane 56 during movement between the first (retracted) position and the second (extended) position. In the case of a rotary bearing, the connector beam 302 rotates in a plane parallel to the plane 56.

In this embodiment, the connector beam 302 is driven by a rotary tool 306. In another embodiment, the connector beam 302 may be driven to the second (extended) position by a pre-loaded spring which is released after the panel 40 has been installed.

In this embodiment, the connector beam 302 is driven to the second (extended) position by a rack-and-pinion mechanism. In another embodiment, the connector beam 302 may be slid to the second (extended) position by providing a handle which extends down from the connector beam 302 through a slot in the panel 40, manually gripping the handle, and pushing the handle along the slot so that the connector beam 302 slides on its bearings.

In the embodiment of FIGS. 8-11, the biasing arrangement comprises a spring 201 coupled to the link 350, and the spring 201 holds the link in its upright orientation by applying a biasing force to the link. The upright orientation may or may not be a strictly vertical orientation.

In alternative embodiments, other biasing arrangements may be used. For instance, the grow-out 202 may carry a counter-weight which biases the biases the link 350 towards its upright orientation.

Instead of providing a dedicated support structure, such as a fixed trailing edge rib, to support the inboard or outboard edge of the trailing edge panel, the embodiments above use an existing aerodynamic structure (the fairing 32) to support the trailing edge panel via a panel support arrangement 300. The absence of a dedicated support structure reduces weight, and minimizes the space taken up in the trailing edge.

The panel support arrangement 300 enables the routings 70 to be installed or removed as a modular unit by moving the routings 70 in the fore-aft direction (transverse to their length) rather than by threading the routings 70 in a spanwise direction (along their length). The routings 70 can be installed or removed in the fore-aft direction (transverse to their length) without clashing with the panel support arrangement 300. This can be contrasted with the mid-span support links 60 which must not be present during installation or removal of the routings 70.

Thus, the routings 70 may be installed or removed by moving them transverse to their length (i.e. in the fore-aft direction) past the link 350. The low profile of the panel support arrangement 300 ensures that it does not clash with the routings 70 as they are installed or removed.

The embodiments above describe a support arrangement 300 for a lower trailing edge panel 40, but in an alternative embodiment a similar support arrangement may be provided for an upper trailing edge panel.

The fairing 32 is attached to the lower cover 8, preferably by one or more tension joints 34. Alternatively, the fairing 32 may be attached to another part of the wingbox, such as the rear spar.

In the embodiments above, the second end of the link is pivotally attached to a flap-track fairing 32 at the second pivot joint. In other embodiments of the disclosure herein, the second end of the link may be pivotally attached to another support structure, such as another type of fairing, or a spoiler support bracket. The support structure may be attached to the rear spar, to the upper or lower cover, or to another part of the wingbox.

Most typically the support structure is attached to the lower cover, preferably by a tension joint.

In the detailed examples given above, the support structure (fairing 32) is positioned inboard of the inboard edge 52 of the trailing edge panel 40, and the link 350 is pivotally attached to the inboard face of the support structure (the inner face 36b of the fairing 32). The outboard edge of the lower trailing edge panel 41 is attached to the fairing 32 by a similar panel support arrangement. In this case, the support structure (fairing 32) is positioned outboard of the outboard edge of the trailing edge panel 41, and the link is pivotally attached to the outboard face of the support structure.

The second pivot joint may be lower than the first pivot joint. This arrangement results in a low profile link, minimizing the space taken up in the trailing edge by the link and reducing the risk of clash with the routings 70 as the routings 70 are installed or removed.

The first pivot joint and the second pivot joint may be located on first and second sides of the plane 56 of the trailing edge panel. This arrangement results in a low profile link, minimizing the space taken up in the trailing edge by the link and reducing the risk of clash with the routings 70 as the routings 70 are installed or removed.

The second pivot joint may comprise a bracket 121 which protrudes from the fairing or other support structure. The use of such a protruding bracket 121 enables the link to be positioned as required.

The link 350 may have a center line which extends downwardly along its full length from the first end of the link to the second end of the link. This arrangement results in a low profile link, minimizing the space taken up in the trailing edge by the link 350 and reducing the risk of clash with the routings 70 as the routings 70 are installed or removed.

Orienting the pivot axes 112, 122 in the fore-aft (or chordwise direction) enables the panel to deflect easily in the spanwise direction.

A center line of the link 350 may extend in a plane which is parallel with the plane of the spar web, and/or in a vertical spanwise plane. This can be contrasted with the mid-span support link 60, or the lower strut in US2013/0146712, which extend in a vertical chordwise plane and hence may occupy valuable space within the trailing edge.

The connector beam 302 may cross above or below the inboard edge 52 or outboard edge of the trailing edge panel. This enables the connector beam 302 to be positioned close to the inboard or outboard edge of the trailing edge panel.

The first end of the link may be pivotally attached to the upper surface 53 of the lower trailing edge panel; and the second end of the link may be pivotally attached to the inner surface 36b of the fairing. This ensures that the link 350 is not exposed to airflow during flight of the aircraft.

The first end of the link 350 may be pivotally attached to the lower trailing edge panel adjacent to one of the spanwise edges of the trailing edge panel. This enables the link to support the spanwise edge of the trailing edge panel, preventing flutter.

The leading edge 50 of the panel 40 may be secured to the wingbox via the anchor nut rail 55 before the panel support arrangements 300 are used to secure the inboard and outboard ends of the panel. However, this is not essential, and in other embodiments the order may be reversed: i.e. the panel support arrangements 300 may be fixed before the leading edge 50 of the panel 40 is secured to the wingbox.

In the embodiments above, the first end of the link is attached to the lower trailing edge panel at a first pivot joint 110 and the second end of the link is attached to the support structure 32 at a second pivot joint 120. Preferably the first pivot joint is higher than the second pivot joint. This arrangement results in a low profile link, minimizing the space taken up in the trailing edge by the link 350 and reducing the risk of clash with the routings 70 as the routings 70 are installed or removed.

In one alternative embodiment, the first and second ends of the links may be rigidly attached to the lower trailing edge panel and the support structure respectively. In another alternative embodiment only the second end of the link may be pivotally attached via a pivot joint 120, the first end 101 of the link being rigidly attached to the lower trailing edge panel via the connector beam 302.

In the embodiments above the wingbox has a rear spar 9 and a forward spar 13. In other embodiments the wingbox may have more than two spars, or only a rear spar.

Where the word 'or' appears this is to be construed to mean 'and/or' such that items referred to are not necessarily mutually exclusive and may be used in any appropriate combination.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing comprising:
   a wingbox with an upper cover, a lower cover, and a rear spar;
   a trailing edge panel with a leading edge, wherein the leading edge of the trailing edge panel is attached to the wingbox and wherein the trailing edge panel defines a plane;
   a support structure attached to the wingbox;
   a connector movably mounted to the trailing edge panel on a bearing, such that the connector is movable parallel to the plane; and
   a link with a first end and a second end, wherein the first end of the link is attached to the connector and the second end of the link is attached to the support structure.

2. The aircraft wing according to claim 1, wherein:
   the connector comprises a rack; and
   the aircraft wing comprises a pinion gear coupled to the rack.

3. The aircraft wing according to claim 1, wherein the bearing is a linear bearing.

4. The aircraft wing according to claim 1, wherein the trailing edge panel is a lower trailing edge panel.

5. The aircraft wing according to claim 4, wherein the lower trailing edge panel has an upper surface and a lower surface, the lower surface being configured to be exposed to airflow during flight of the aircraft wing.

6. The aircraft wing according to claim 5, wherein the bearing is mounted to the upper surface of the lower trailing edge panel.

7. The aircraft wing according to claim 1, further comprising:
   a spoiler; and
   a spoiler stop protruding from an upper surface of the lower trailing edge panel;
   wherein the spoiler stop is configured to be contacted by the spoiler in an event of an over-travel failure of the spoiler.

8. The aircraft wing according to claim 1, wherein:

the support structure is attached to the lower cover; or the support structure is attached to the lower cover by a tension joint.

9. The aircraft wing according to claim 1, wherein the support structure comprises a fairing.

10. The aircraft wing according to claim 9, further comprising a flap, and a flap deployment mechanism which is configured to deploy the flap, wherein the fairing covers the flap deployment mechanism.

11. The aircraft wing according to claim 9, wherein:
the lower trailing edge panel has a trailing edge opposite the leading edge, and a pair of opposite spanwise edges;
the fairing has an upper edge;
the bearing is attached to the upper surface of the lower trailing edge panel adjacent to one of the spanwise edges of the lower trailing edge panel; and
the second end of the link is attached to the fairing adjacent to the upper edge of the fairing.

12. The aircraft wing according to claim 1, wherein:
the second end of the link is pivotally attached to the support structure at a pivot joint; and
the first end of the link is higher than the pivot joint.

13. The aircraft wing according to claim 12, wherein the first end of the link is directly above the pivot joint.

14. The aircraft wing according to claim 1, wherein:
the first end of the link is pivotally attached to the connector at a first pivot joint; and
the second end of the link is pivotally attached to the support structure at a second pivot joint.

15. The aircraft wing according to claim 14, wherein:
the first pivot joint is configured to permit rotation about a first pivot axis; and
the second pivot joint is configured to permit rotation about a second pivot axis.

16. The aircraft wing according to claim 1, wherein:
the trailing edge panel further comprises a trailing edge, an inboard edge, and an outboard edge;
the support structure comprises an inboard face and an outboard face; and
either:
the support structure is positioned inboard of the inboard edge of the trailing edge panel; and
the link is attached to the inboard face of the support structure;
or
the support structure is positioned outboard of the outboard edge of the trailing edge panel; and
the link is attached to the outboard face of the support structure.

17. The aircraft wing according to claim 1, comprising routings which run along the aircraft wing behind the rear spar in a spanwise direction.

18. A method of assembling or disassembling the aircraft wing of claim 17, the method comprising installing or removing the routings by moving the routings transverse to a length of the routings past the link.

19. A method of installing a trailing edge panel in an aircraft wing, the method comprising:
providing the aircraft wing, which comprises:
a wingbox with an upper cover, a lower cover, and a rear spar;
a trailing edge panel with a leading edge, wherein the trailing edge panel defines a plane;
a support structure attached to the wingbox;
a connector mounted to the trailing edge panel on a bearing, such that the connector is movable parallel to the plane; and
a link with a first end and a second end, wherein the second end of the link is attached to the support structure;
attaching the leading edge of the trailing edge panel to the wingbox;
moving the connector on the bearing from a first position to a second position, where the connector is aligned with the first end of the link; and
then attaching the connector at the second position to the first end of the link.

20. The method according to claim 19, wherein:
the bearing is a linear bearing; and
the connector translates on the linear bearing.

21. An aircraft wing comprising:
a wingbox with an upper cover, a lower cover, and a rear spar;
a trailing edge panel with a leading edge, wherein the leading edge of the trailing edge panel is attached to the wingbox;
a support structure attached to the wingbox;
a connector movably mounted to the trailing edge panel on a bearing; and
a link with a first end and a second end, wherein the first end of the link is attached to the connector and the second end of the link is attached to the support structure;
wherein:
the connector comprises a rack and the aircraft wing further comprises a pinion gear coupled to the rack; or
the trailing edge panel is a lower trailing edge panel; or
the support structure is attached to the lower cover; or
the support structure comprises a fairing.

* * * * *